Jan. 5, 1926.
J. A. HEPPERLEN
MOTOR CONTROLLER
Filed Oct. 9, 1922
1,568,735
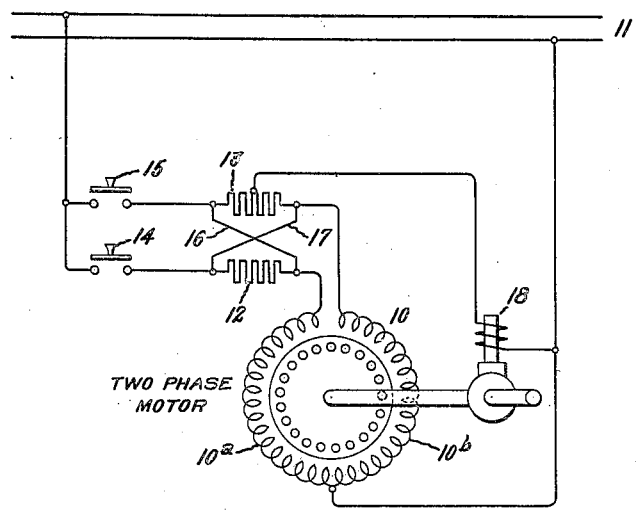
Inventor:
John A. Hepperlen;
by Alexander S. ____
His Attorney.

Patented Jan. 5, 1926.

1,568,735

UNITED STATES PATENT OFFICE.

JOHN A. HEPPERLEN, OF EAST ORANGE, NEW JERSEY, ASSIGNOR TO GENERAL ELECTRIC COMPANY, A NEW YORK CORPORATION.

MOTOR CONTROLLER.

Application filed October 9, 1922. Serial No. 593,221.

*To all whom it may concern:*

Be it known that I, JOHN A. HEPPERLEN, a citizen of the United States, residing at East Orange, in the county of Essex, State of New Jersey, have invented certain new and useful Improvements in Motor Controllers, of which the following is a specification.

My invention relates to reversing control systems for alternating current motors, and in particular to operating a two-phase motor in the forward and reverse direction from a single-phase source of supply.

One of the objects of the invention is to provide a simple and effective system of the character indicated.

Another object of the invention is to provide a simple and effective arrangement for controlling an electromagnetic brake so as to improve the torque of the motor which is operated at will in the forward and reverse direction in accordance with the principal object of the invention.

In the accompanying drawing there is shown in very simplified diagram a system of reversing control for an alternating current motor in accordance with the invention. Referring to the drawing, the alternating current motor 10 is preferably of the two-phase type, although not necessarily of this type. A control system is provided for this motor so that it may be operated in the forward and reverse directions from the single-phase source of supply 11. In order to accomplish this result, I have provided a simple and effective arrangement whereby a phase displacement is produced between the phase windings of the motor. This arrangement comprises phase displacement means or devices indicated as resistors 12 and 13 which are respectively connected in the phase windings of the motor. The resistors are interconnected in such a manner that when the reversing mechanism comprising the forward push button 14 and the reversing push button 15 are selectively operated, the resistors are connected in multiple with each other in series with one of the phase windings of the motor, depending upon the direction of motor operation desired, and the resistors are excluded from the other phase winding of the motor. This interconnection of the resistors comprises the connection 16 which connects the one end of the resistor 13 with the opposite end of the resistor 12 and the connection 17 which connects the opposite end of the resistor 13 to the first end of the resistor 12. The electromagnet brake 18 for the motor has its winding connected to a substantial mid-point of the resistor 13 so that the magnet brake is energized to release its holding effect on the motor when the reversing switch mechanism is operated for either direction of operation, and the brake is applied when the motor is disconnected from the source of supply by the operation of the reversing switch mechanism.

As thus constructed and arranged, the operation of my invention is as follows:— Assume that it is desired to operate the motor in the forward direction. The push button 14 will be closed, thereby connecting the resistors 12 and 13 in multiple with each other in series with the motor phase winding 10ª and connecting the motor phase winding 10ᵇ directly to the source of supply 11 through the connection 17. The phase winding 10ª will have a phase displacement with respect to the winding 10ᵇ so that the motor will operate in the direction determined by the operation of the controlling switch mechanism. Because of the fact that the winding of the electromagnet brake 18 is connected to the mid-point of the resistor 13, the brake will be energized to release its holding effect on the motor, and furthermore because of the fact that the brake magnet has an inductive effect there will be a further phase displacement of the windings of the motor with respect to each other so that a greater torque is produced than would be the case if the brake winding were not energized in this manner. Because of the fact that the current through the brake magnet has a circuit through the right-hand portion of resistor 13, the resultant current through this portion of resistor 13 due to the brake coil current and the current through the motor winding 10ª will cause a drop in potential through the right-hand portion of the resistor which will give a greater phase displacement than if the brake coil were energized directly across the supply circuit. In other words, the brake magnet is also used as a phase displacement device so as to assist the resistors 12 and 13. When the push button 14 is released, the motor is disconnected from the source of supply and the electromagnet brake is deenergized so that the brake applies its holding effect to the motor. In case it is desired to operate the motor in the reverse direction, the push button 15 will be closed, thereby connecting the resistors 12 and 13 in multiple with each other in series with the motor phase winding 10$^b$ and connecting the motor phase winding 10$^a$ directly to the supply circuit through the connection 16. It will also be noticed that the brake winding is energized to release the brake, and that substantially the same potential is supplied to the brake winding as was the case for forward operation. It will also be noticed that the brake winding operates as an inductance to assist the resistors 12 and 13 in the phase displacement of the motor windings so as to thereby obtain an increased motor torque.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A system of control for operating a polyphase alternating current motor in the forward and reverse direction from a single-phase source of supply, comprising phase modifying means connected to the phase windings of the motor, reversing switch mechanism, an electromagnet brake, and connections whereby the said phase modifying means is excluded from one of the motor phase windings by the said switch mechanism depending on the desired direction of rotation of the motor, substantially equal potential is applied to the said electromagnet brake for each direction of motor operation and the brake magnet serves as a phase displacement device for the motor phase windings.

2. A system of control for operating a two-phase alternating current motor in the forward and reverse direction from a single-phase source of supply, comprising two multiple connected resistors, reversing switch mechanism, an electromagnetic brake for the motor having one terminal of the brake winding connected to a substantial mid-position of one of said resistors, and connections whereby upon operating the said reversing switch mechanism for either direction of operation the said multiple connected resistors are in series with one of the motor phase windings, the other motor phase winding is connected directly to the source of supply, and the brake magnet serves as a phase displacement device for the motor phase windings.

In witness whereof, I have hereunto set my hand this 6th day of October, 1922.

JOHN A. HEPPERLEN.